3,040,207
VARIABLE INTENSITY AUTOMOTIVE VEHICLE
LIGHTING AND SIGNALLING SYSTEM
Raymond B. Grontkowski, Bronx, N.Y., assignor to Signal-Stat Corporation, Brooklyn, N.Y., a corporation of New York
Filed Nov. 6, 1959, Ser. No. 851,298
5 Claims. (Cl. 315—77)

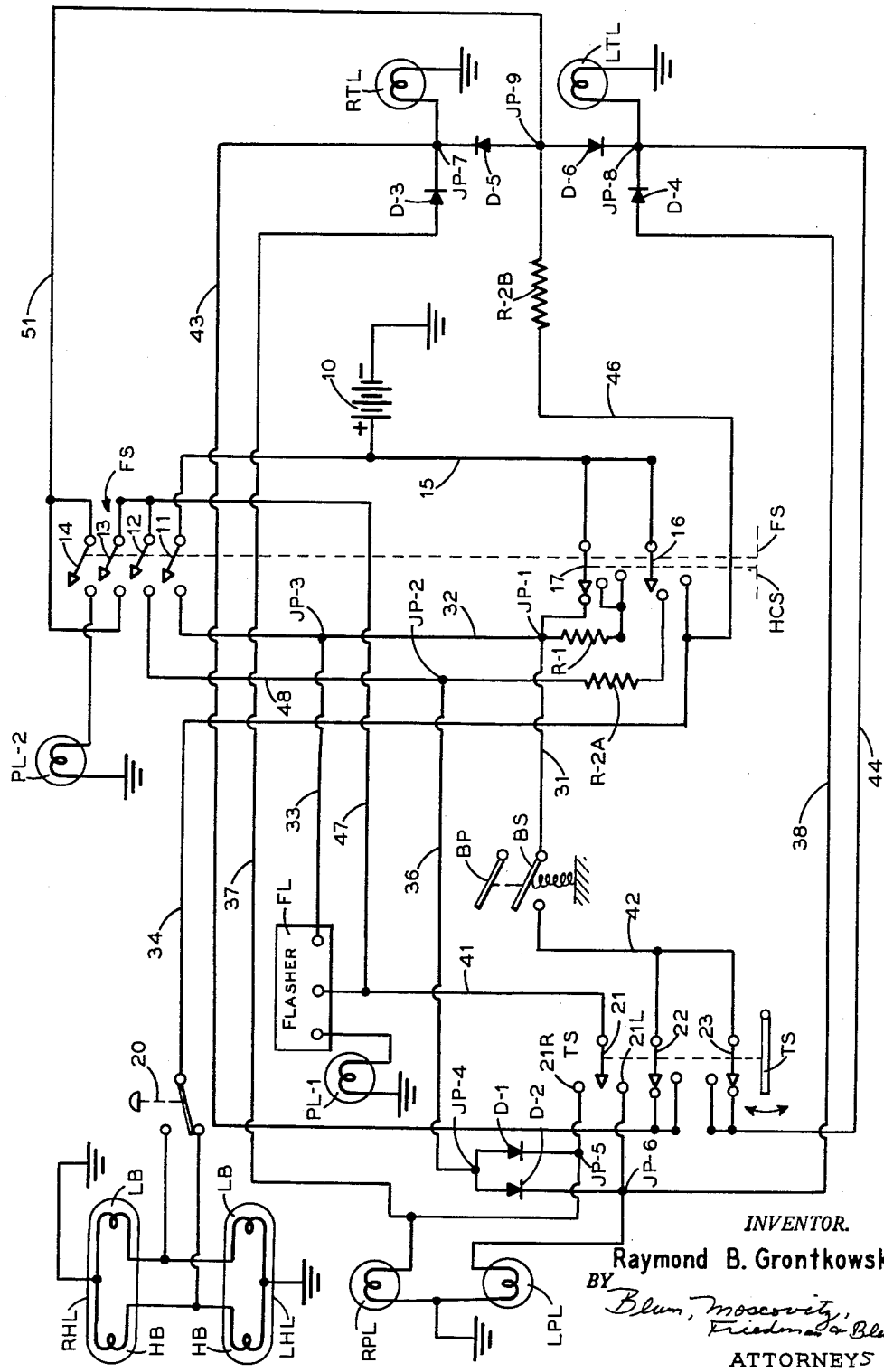

This invention relates to lighting and signal circuits for automotive vehicles and, more particularly, to a novel, simple, and inexpensive circuit arrangement utilizing the usual front parking lamps and rear tail lamps as selectively energized turn signal lamps or warning signal lamps, and in which these lamps, when selectively energized as turn signal lamps or stop lamps, as by operation of the brake pedal or turn signal switch, burn with a selected high brilliancy during day-time driving and with a reduced intermediate brilliancy during night-time driving; the lamps, when functioning only as marker lamps, burning with a selected low brilliancy. In addition, all of the lamps may be concurrently flashingly energized at such high value of brilliancy, by operation of a "flare" switch, to serve as emergency warning lamps.

The signal lamp complement of modern automotive vehicles includes, as a minimum, brake or stop lamps which are energized whenever the vehicle brakes are applied. In addition, most automotive vehicles are equipped with selectively flashingly energized lamps for signalling a projected turn. Various arrangements are used for these several lamps. In one known arrangement, a two filament lamp is used as a combined brake lamp and tail lamp, a relatively low powered filament providing the marker indication for the tail lamp and a relatively high powered filament providing the brake lamp effect. In this arrangement, the same relatively high powered filament may be flashingly energized as a turn signal, with an additional high powered filament in a combined front parking and turn signal lamp being also flashingly energized as a turn signal.

In other arrangements separate lamps are used for the tail lamps, the parking lamps, the front turn signal lamps, and the rear combined turn signal and brake lamps. All of these arrangements thus require either special dual filament lamps or additional lamp bulbs and, quite frequently, additional lamp casings therefor. Naturally, this tends to increase the expense of the lamp equipment on an automotive vehicle.

However, a more serious problem is involved in providing the proper brilliancy of the signal lamps for daytime and night-time driving. If the signal lamps, such as the brake lamps and the turn signal lamps, are of sufficient brilliancy so as to be discernible readily and easily under normal daylight driving, particularly on a bright sunny day, then the brilliancy is too great for night-time driving, resulting in lamp glare rather than a true signal indication. On the other hand, if the brilliancy of the signal lamps is reduced to a level which is adequate for night-time driving without glare, then the illumination level or brilliancy for day-time driving is insufficient, particularly when the lamps are located next to polished parts of the vehicle, such as chromium plated bumpers, grill-work and the like.

Accordingly, it has been proposed to provide lamp systems in which the brilliancy of the signal lamps is automatically reduced for other than daylight driving, as by inserting voltage reducing resistances in series with such lamps during other than daylight driving. One proposed arrangement involves a relay or the like, or an auxiliary switch means, which is operated in conjunction with the usual head lamp control switch to automatically insert additional resistance into the signal lamp circuits whenever the parking lamps or the head lamps of the vehicle are turned on. While arrangements of this type are effective in reducing the brilliancy of the signal lamps for night-time driving while still maintaining full brilliance for daytime driving, the system does not offer any solution to the other problem of reducing the lamp equipment of a motor vehicle or of reducing the expense of the lamps, as would be encountered where dual filament lamps are used for both marker lamp and signal lamp purposes. Examples are combined tail and stop lamps and combined front parking and turn signal lamps. In effect, these illumination reducing systems have merely added to the cost and complications of the lamp system without any compensating advantages.

In accordance with the present invention, there is provided an automotive vehicle marker and signal lamp system utilizing only the usual pair of dual filament head lamps, the usual pair of front parking lamps, and the usual pair of tail lamps. The head lamps are controlled in the usual manner by a headlamp control switch, having "off," "parking lamps on," and "head lamps on" positions, and through the usual foot button by means of which the head lamp beams may be switched between "high" and "low." However, plural energizing circuits are provided for the parking lamps and the tail lamps.

The head lamp switch is provided with an additional contact which, in the "off" or usual daytime position of the head lamp switch, provides a direct battery connection by means of which the tail lamps may be energized at full brilliancy whenever the brake pedal is depressed so as to give a high powered "stop" signal during daytime driving and which is fully effective even under conditions of bright sunlight. This additional contact on the head lamp switch, in its "daytime" position, also provides a direct connection from the battery to a flasher which may be selectively connected to either the left or right parking and tail lamps so as to flash these lamps at such full brilliancy to indicate a prospective turn during daytime driving. A "flare" or warning lamp switch is arranged, when closed, to connect the flasher directly to the battery and also to connect the flasher to both parking lamps and both tail lamps so that the parking lamps and tail lamps are concurrently flashed at full brilliance to provide a warning lamp or "emergency stop" signal as when the vehicle may be stopped alongside a road for emergency repairs or the like.

When the head lamp switch is moved to either of its "on" positions, as to turn on the parking lamps or the head lamps, as well as the tail lamps in both cases, the additional contact mentioned above is opened and a second additional contact is closed in both "on" positions of the head lamp switch. This second additional contact connects the brake switch and the flasher to the battery in series with a resistance which reduces the effective illumination available for either the brake lamps or the parking and tail lamps, when used as turn signal lamps, to an intermediate value which is sufficiently brilliant for night driving but will not provide a glare. In addition, the tail lamp contact of the head lamp control switch is connected to the parking lamps and tail lamps through a resistance sufficient to reduce the brilliancy of these lamps, when acting merely as marker lamps, to a low value of illumination, such as 4 cp. for example. In the head lamps on position of the control switch, the head lamps are connected to battery through the usual foot operated switch, and the tail lamps, but not the parking lamps, are connected to battery through a resistance sufficient to reduce the illumination of the tail lamps to such relatively low value. In either of the "on" positions of the control switch, the aforementioned "flare" switch bypasses the head lamp control switch so that the parking and tail lamps may be flashed at the full high brilliancy for an emergency stop.

A distinctive feature of the present invention, and one which makes possible the foregoing selective multiple circuit energization of the single filament parking and tail lamp, is the use of gating diodes so arranged with each of the parking and tail lamps that, when the brake switch, for example, is depressed, only the tail lamps are energized and, when the turn signal switch is turned to either its left or right position, one of the front parking lamps and one of the rear tail lamps are flashingly energized without the other parking lamp and tail lamp being flashingly energized, and remaining steadily energized under control of the brake switch if the brakes are applied. Also, these gating diodes provide for the control switch, in the "head lamps on" position, to energize the tail lamps at such relatively low value of illumination without correspondingly energizing the parking lamps, while still providing for both the parking and tail lamps to be flashingly energized at the intermediate value of illumination. The gating diodes also make possible the flashing energization of the parking and tail lamps upon closure of the "flare" switch to signal an emergency stop of the vehicle.

Consequently, without the use of relays or the like, and utilizing only the usual complement of head lamps, parking lamps, and tail lamps, and without the use of dual filament lamps, an automotive vehicle light system is provided in which the parking and tail lamps can be energized at any one of three levels of brilliancy depending upon whether they are used as signal lamps during daylight driving, as signal lamps during other than daylight driving, or merely as marker lamps during other than daylight driving. Furthermore, the invention system is inexpensive and simple, and not liable to malfunction.

For an understanding of the invention principles, reference is made to the following description of a typical embodiment thereof as illustrated in the accompanying drawing. In the drawing, the single FIGURE is a schematic wiring diagram of an automotive vehicle lamp circuit embodying the invention.

Referring to the drawing, the vehicle is illustrated as equipped with the usual pair of headlamps RHL and LHL, the usual pair of front parking lamps RPL and LPL, and the usual pair of tail lamps RTL and LTL. The headlamps are the usual dual filament head lamps including high beam filaments HB and low beam filaments LB. However, both the parking lamps and the tail lamps are single filament bulbs. In addition to the foregoing lamps, the vehicle may be equipped with a first pilot lamp PL-1 which is flashed whenever the turn signal is in operation, and which may comprise, if desired, a pair of pilot lamps for respective left and right turns. A second pilot lamp PL-2 is provided for use with the flare switch when the latter is closed to signal an emergency stop.

All of these lamps are under the control of a headlamp control switch HCS, of novel design, a turn signal switch TS which may be of the usual type slightly modified, and the brake switch BS which is schematically illustrated as operated by the brake pedal BP, and which is closed whenever the vehicle brakes are applied. A flare switch FS is provided for flashing the parking and tail lamps concurrently at high brilliance to indicate an emergency stop or emergency parking. The flare switch FS and the headlamp control switch HCS may be combined in a single switch having a pair of independent operators as schematically indicated by the dashed lines.

The electrical requirements for the lighting circuit are provided by a battery 10 having a grounded negative terminal and a positive terminal connected to supply main 15. Battery 10 is representative of the usual 6-volt or 12-volt battery-generator system provided on automotive vehicles. Supply main 15 is connected to pole 11 of four pole, single throw switch FS having other poles 12, 13 and 14, and also to poles 16 and 17 of the two-pole, headlamp control switch HCS. In switch HCS, pole 16 is the usual movable circuit closure which is open in the "off" position of switch HCS and which has two "on" positions, one of which is the "parking lamps on" position and the other of which is the "headlamps on" position. Pole 17 is movable conjointly with pole 16 between these three positions, in each one of which it closes a circuit. In the "off," or "daylight" position of switch HCS shown in the drawing, pole 17 connects main 15 directly to junction point JP-1 which is, in turn, connected by conductor 31 to brake switch BS operated by brake pedal BP and, by conductors 32 and 33 through junction JP-3, to flasher FL. In either of the "on" positions of switch HCS, pole 17 connects main 15 to junction point JP-1 through a series resistor R-1.

In the "off" position of switch HCS, pole 16 does not complete any circuit. In the "parking lamps on" position of this switch, pole 16 connects main 15 to junction point JP-2 through a series resistor R-2A. In the "headlamps on" position of switch HCS, pole 16 connects main 15 to conductor 34 connected to the usual foot pedal operated switch 29 which is provided to shift the headlamps between the high beam filaments HB and the low beam filament LB.

A conductor 36 connects junction point JP-2 to junction point JP-4 which is connected, through respective gating diodes D-1 and D-2, to respective junction points JP-5 and JP-6. Junction points JP-5 and JP-6 are respectively connected to front parking lamps RPL and LPL, and also, through conductors 37 and 38, respectively, and respective gating diodes D-3 and D-4 to junction points JP-7 and JP-8, respectively.

The load or "L" terminal of flasher FL is connected by conductor 41 to pole 21 of the three-pole, three-position turn signal switch TS. Pole 21 is normally not engaged with any contact but, to signal a right turn, is engaged with contact 21R connected to junction JP-5 and, to signal a left turn, is engaged with contact 21L connected to junction JP-6. A conductor 42 connects brake switch BS in parallel to poles 22 and 23 of switch TS. In the off position and in the left turn position of switch TS, pole 22 is engaged with contacts connected to a conductor 43 connected to junction point JP-7. In the off and right turn positions of switch TS, pole 23 is engaged with contacts connected through conductor 44 to junction JP-8. In the right turn position of switch TS, pole 22 is open and pole 23 is open in the left turn position of switch TS.

Of course, the tail lamps should be lit as marker lamps when switch HCS is in the "headlamps on" position as well as when this switch is in the "parking lamps on" position. In the "headlamps on" position of switch HCS, pole 17 connects supply main 15 to a conductor 46 which is connected through a series resistor R-2B to a junction point JP-9. This latter junction point is connected by gating diodes D-5 and D-6 to junction points JP-7 and JP-8, respectively.

As the gating diodes form an important feature of the invention, it is deemed best to explain their operation before describing the overall operation of the lamp system under different conditions. With the diodes D-1 and D-2 connected to junction point JP-4, it will be understood that positive going potential will permit current flow from junction JP-4 to junctions JP-5 and JP-6, but not in the reverse direction. Also, with the network of diodes D-3 through D-6, positive going potential will flow to junction points JP-7 and JP-8, and from these points to the tail lamps RTL and LTL, but will not flow in the reverse direction from junction points JP-7 and JP-8 toward junction point JP-9 or toward junctions JP-5 and JP-6. Thus, all of the diodes act as gates permitting current flow in certain directions and over certain circuits towards a common point, for example, but preventing current flow in the reverse direction.

In addition, before describing the overall operation of the lamp system, it is desirable to describe the connections of flare switch FS. When this switch is closed, pole 11 connects supply main 15 connected to junction point JP-3. With pole 12 closed, the flasher load terminal is connected by conductor 47, pole 12, and conductor 48 to junction JP-2. Pole 13 connects conductor 47 to conductor 51 which is in turn connected to junction point JP-9. The other pole 14 is used to connect a pilot lamp PL-2 to conductor 51 when the switch FS is closed. It should be noted that flasher FL is provided, for turn signal operation, with a pilot lamp PL-1 connected to the "P" terminal of the flasher.

*Daylight Operation*

During daylight operation, the respective switches occupy the position shown in the drawing. Preferably, the front parking lamps and the tail lamps are normally rated at 51 cp., and resistor R-1 has a value such that, when the parking lamps and/or tail lamps are energized over a circuit with this resistance in series, their effective brilliance will be 32 cp. The value of resistors R-2A and R-2B is such as to reduce the effective candle power of the parking and tail lamps, respectively, to 4 cp., for example. With head lamp control switch HCS in the off position, pole 17 applies the full battery voltage from main 15 to junction point JP-1.

Should the brakes now be applied, resulting in closure of switch BS, the tail lamps will be energized over the following circuit. From junction point JP-1, through conductor 31, switch BS, poles 22 and 23 of switch TS in parallel, conductors 43 and 44 in parallel, respective junction points JP-7 and JP-8, and the respective tail lamps RTL and LTL to ground. The tail lamps are thus operated as brake or stop lamps at the full brilliancy of, for example, 50 cp.

To signal a right turn, turn signal switch TS is moved clockwise one position. Pole 21 thus engages contact 21R, pole 22 is opened, and pole 23 remains connected to conductor 44. The right parking lamp RPL is now energized over the following circuit: from junction point JP-1, through conductor 32, junction point JP-3, conductor 33, flasher FL, conductor 41, pole 21 of switch TS, contact 21R of this switch, junction JP-5, and lamp RPL. Also, and starting from junction point JP-5, the right tail lamp RTL is energized over the following circuit: conductor 37, diode D-3, junction JP-7, and lamp RTL. Lamps RPL and RTL are thus intermittently energized through flasher FL, with pilot lamp PL-1 also being intermittently energized. These two lamps are furthermore energized at the full brilliance of 50 cp. as there is no additional resistance in series in this circuit.

To signal a left turn, switch TS is swung counter-clockwise one step from the illustrated position. Pole 21 now engages contact 21L, pole 22 remains connected to conductor 43, and pole 23 is open. As far as pole 21, the circuit is as previously described for a right turn. However, the lamps are now energized as follows: contact 21L, junction JP-6, and lamp LPL. For the tail lamp, the circuit from junction JP-6 includes conductor 38, diode D-4, junction JP-8, and lamp LPL to ground.

Should flare switch FS be closed, the two parking lamps and the two tail lamps are concurrently flashingly energized as follows: With pole 11 closed, the positive potential of main 15 is applied to junction JP-3 through conductor 32. The following circuit is thus completed: conductor 33, flasher FL, conductor 47, pole 12 of switch FS, conductor 48, junction JP-2, conductor 36, junction JP-4, diodes D-1 and D-2 in parallel to junctions JP-5 and JP-6, and thus to parking lamps RPL and LPL in parallel and to tail lamps RTL and LTL through conductors 37 and 38 in parallel, diodes D-3 and D-4, respectively, and the two tail lamps in parallel. The parking lamps and tail lamps are intermittently energized, as are also pilot lamps PL-1 and PL-2. In this particular state of the switches, a parallel intermittent energizing circuit for the tail lamps is also closed from conductor 47 through pole 13, conductor 51, junction JP-9, and diodes D-5 and D-6 to the tail lamps in parallel. All four lamps, RPL, LPL, RTL, and LTL are thus flashed at the full brilliancy of 50 cp.

*Other Than Daylight Operation*

When switch HCS is moved to the "parking lamps on" position, pole 16 is connected to junction point JP-2 through resistance R-2A, and pole 17 is connected to junction point JP-1 through resistance R-1. The parking lamps and tail lamps are thus energized at the low brilliance of 4 cp. as follows: battery 10, main 15, pole 16, resistance R-2A, junction point JP-2, conductor 36, junction point JP-4, diodes D-1 and D-2 in parallel, junction points JP-5 and JP-6, respectively. From here the circuit branches to the parking lamps and, through conductors 37 and 38, diodes D-3 and D-4, and junction points JP-7 and JP-8 to the tail lamps.

If the brakes are now applied, the tail lamps only are energized over the following circuit with a brilliance of 32 cp. From battery 10, through main 15, pole 17, resistance R-1, junction point JP-1, conductor 31, switch BS, poles 22 and 23 in parallel, conductors 43 and 44 in parallel, and lamps RTL and LTL. The resistance R-2A is thus bypassed.

Assuming that a left turn is to be signalled, switch TS is moved one position counter-clockwise so that pole 21 engages contact 21L, pole 22 is connected to conductor 43, and pole 23 is disengaged from conductor 44. With pole 23 open, application of the brakes and resultant closure of switch BS will be of no effect on lamp LTL. Lamp RTL will remain burning at the 4 cp. brilliancy. However, lamp LTL will be intermittently energized over the following circuit: battery 10, main 15, pole 17, resistance R-1, junction point JP-1, conductor 32, junction JP-3, conductor 33, flasher FL, conductor 41, pole 21, contact 21L, and junction JP-6. From here a connection leads directly to parking lamp LPL and, through conductor 38, diode D-4 and junction JP-8, to left tail lamp LTL. The left parking and tail lamps are thus flashed at 32 cp., the intermediate illumination value. Due to gating diode D-6, this higher voltage applied to tail lamp LTL intermittently cannot effect the steady burning of lamp RTL at the low voltage of 4 cp. The same holds true with respect to the effect of diode D-2 blocking current flow from flasher FL to right parking lamp RPL. The converse of this operation takes place when switch TS is moved to the right turn position. Thus, in either turn signaling position, the corresponding parking lamp and tail lamp are flashed at the intermediate brilliance, while the other parking lamp and tail lamp remain steadily illuminated at the low level of illumination.

Should switch HCS be moved to the "headlamps on" position, the headlamps are directly energized from battery 10 in the same manner as previously described for day-time operation. However, the tail lamps are energized as follows: battery 10, main 15, pole 16, conductor 46, resistance R-2B, junction JP-9, diodes D-5 and D-6 in parallel, and lamps RTL and LTL in parallel. With resistor R-2B in circuit, the lamps are illuminated a low value of illumination, such as 4 cp. For turn signal operation, either lamp RTL or LTL is flashingly illuminated at the intermediate value of illumination, such as 32 cp., by the circuit including conductor 43 or 44 to junction JP-7 and JP-8, and which bypasses the resistor R-2B. Thus, either one of the tail lamps may be flashed at the intermediate brilliancy with the other tail lamp being steadily energized at the low brilliancy.

The operation of the flare switch in over-riding the other circuits and in flashingly illuminating all of the parking and tail lamps at the full brilliance, of 50 cp. for example, is the same as in day-time operation.

From the foregoing, it will be apparent that using only single filament lamps and only two parking lamps and two tail lamps, plus novel switch arrangements and the gating diodes, it is possible to have these lamps energized at three different values of brilliancy for day-light signalling, for other than day-light signalling, and for night-time marking. For day-light driving, the lamps, operating as signal lamps, are energized at full brilliancy. For other than day-light driving, the lamps, operating as signal lamps, are illuminated at an intermediate brilliancy and, when operating as marker lamps, are illuminated at a very much reduced brilliancy.

While a specific embodiment of the invention has been shown and described in detail to illustrate the application of the invention principles, it will be understood that the invention may be embodied otherwise without departing from such principles.

What is claimed is:

1. An automotive vehicle light and signal system comprising, in combination, plural single filament lamps of relatively high candle power; a source of electric potential; a first energizing circuit for said lamps including a signalling switch; a headlamp control switch connected to said source and having an "off" position, a "parking lamps on" position, and a "head lamps on" position, and, in the "off" position, connecting said signalling switch to said source for energization of said lamps, upon closure of said signalling switch, at a relatively high value of illumination for signalling during daylight driving; a second energizing circuit for said lamps, including said head lamp control switch in an "on" position and a series resistance, for energization of said lamps at a relatively low value of illumination to serve as marker lamps; and a third energizing circuit for said lamps, in shunt with said second energizing circuit and including said head lamp control switch in an "on" position, said signalling switch, and another series resistance, for energization of said lamps at an intermediate value of illumination for signalling during other than daylight driving.

2. An automotive vehicle light and signal system as claimed in claim 1 in which said lamps comprise a pair of tail lamps; and said signalling switch comprises a normally open switch closed responsive to application of the vehicle brakes.

3. An automotive vehicle light and signal system as claimed in claim 1 in which said lamps comprise a pair of parking lamps on the front of the vehicle and a pair of tail lamps on the rear of the vehicle; said signalling switch comprises a turn signal switch operable to selectively energize lamps on the left or right side of the vehicle to signal a turn; and a flasher connected in series between said turn signal switch and said headlamp control switch.

4. An automotive vehicle light and signal system comprising, in combination, right and left front single filament parking lamps of relatively high candle power; right and left rear single filament tail lamps of relatively high candle power; a source of polarized electric potential; a headlamp control switch connected to said source and having an "off" position and an "on" position; a normally open brake switch closed responsive to application of the vehicle brake; a turn signal selector switch; a first energizing circuit for both of said tail lamps including said headlamp control switch in the "off" position, said brake switch, and said turn signal selector switch, in the "off" position, in series for energizing said lamps, upon closure of said brake switch, at a relatively high value of illumination; a second energizing circuit for utilizing said lamps to signal a projected turn and comprising, in series, said headlamp control switch in the "off" position, a flasher, and said turn signal selector switch in one of a pair of closed positions for energizing either the two right lamps or the two left lamps at a relatively high value of illumination; said turn signal switch in either of said operated positions disestablishing the connection between said brake switch and the then flashingly energized tail lamp; said second energizing circuit including a pair of conductors each connecting one parking lamp to the correspondingly located tail lamp and a gating diode in series in each conductor and providing for forward current flow only toward the associated tail lamp; said headlamp control switch in its "on" position connecting a first resistance in series in each of said first and second energizing circuits for energization of the lamps at an intermediate value of illumination for signalling during other than daylight driving; and a third energizing circuit for said lamps including, in series, said headlamp control switch in its "on" position, a second resistance, and a pair of diodes connected in parallel between said second resistance and each of said conductors providing for forward current flow only to said conductors, for energization of said lamps at a relatively low value of illumination to serve as marker or clearance lamps.

5. An automotive vehicle light and signal system as claimed in claim 4 including a normally open flare signalling switch operable, when closed, to connect said flasher between said source and a junction point; and a pair of diodes respectively connecting said junction point to each of said tail lamps and providing for forward flow of current only toward said tail lamps; said flare switch, in the closed position, further connecting the output of said flasher to the junction of said second resistance and said first mentioned pair of diodes; for energization of the four lamps at a high value of illumination at all times when said flare switch is closed.

References Cited in the file of this patent

UNITED STATES PATENTS

| | | |
|---|---|---|
| 2,652,553 | Hollins | Sept. 15, 1953 |
| 2,843,835 | Hollins | July 15, 1958 |